Jan. 26, 1965     W. J. SATOLA     3,166,804
DUCT SPACER WITH CLIPS FOR A SQUIRREL-CAGE ROTOR
Filed Jan. 29, 1962     3 Sheets-Sheet 1

INVENTOR.
WILLIAM J. SATOLA
BY Woodling, Krost,
Granger and Rust
ATTORNEYS

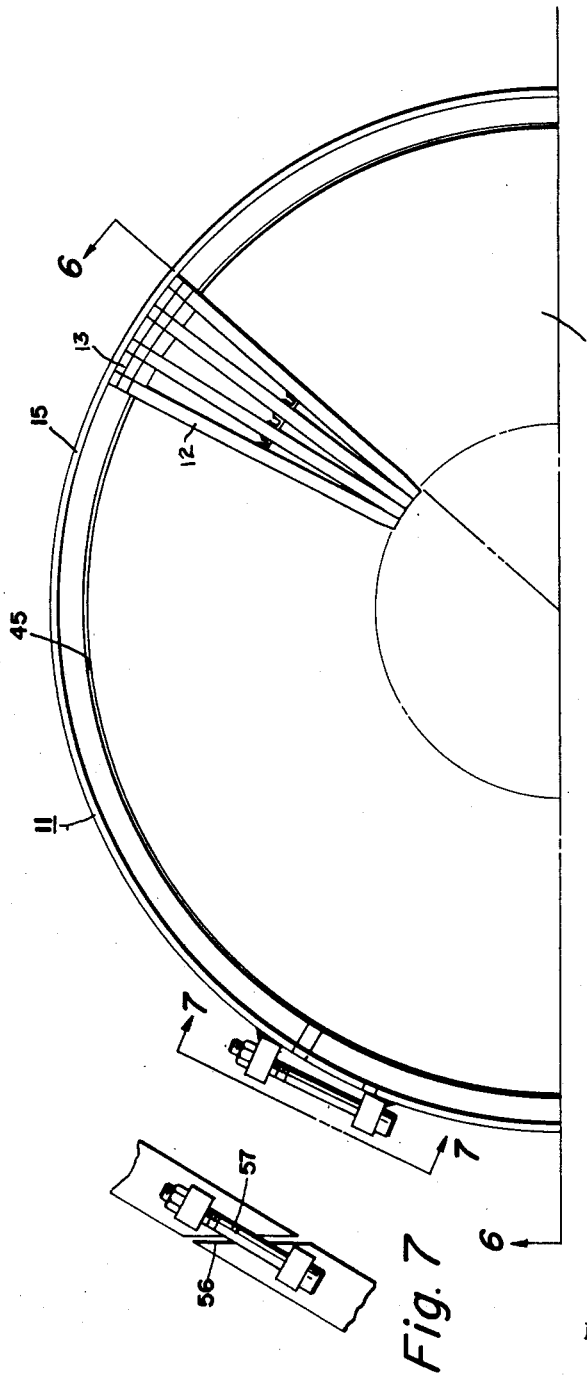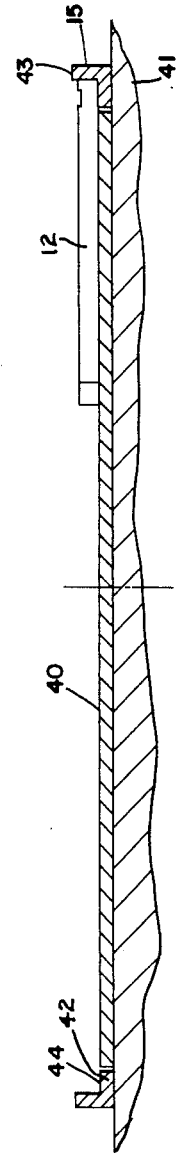

INVENTOR.
WILLIAM J. SATOLA
BY Woodling, Krost,
Granger and Rust
ATTORNEYS

United States Patent Office 3,166,804
Patented Jan. 26, 1965

3,166,804
DUCT SPACER WITH CLIPS FOR A SQUIRREL-CAGE ROTOR
William J. Satola, Shaker Heights, Ohio, assignor to The Reliance Electric & Engineering Co., a corporation of Ohio
Filed Jan. 29, 1962, Ser. No. 169,500
11 Claims. (Cl. 22—116)

The invention relates in general to a spacer for forming a fingerless duct in a squirrel cage rotor and, more particularly, to a temporary and partially removable spacer assembly in which the majority of the spacer may be readily removed from a laminated squirrel cage rotor after the squirrel cage is diecast in such rotor, with clips remaining in the rotor as a part of the spacer.

The prior art has shown different forms of squirrel cage rotors with vent passages to promote cooling of the squirrel cage rotor. Heat is built up in the squirrel cage rotor of an induction motor or generator since the squirrel cage acts as a short-circuited second winding of a transformer. To promote proper operation and increased rating of such an induction machine, air vent passages are desirable, especially in the larger machines, to properly cool the rotor.

Special laminations with fingers attached thereto to provide a finger formed radial ventilating duct in squirrel cage rotors have been used for many years as shown in the Patent 2,176,871. Fingerless duct rotors have also been tried in the prior art but have been difficult to make satisfactorily. A fingerless duct rotor has been proposed wherein finger dies were inserted through a plurality of apertures in a plurality of planes in a cylindrical holder surrounding the rotor. This method had several deficiencies, including the one of permitting only a single spacing of the planes of the radial ventilating ducts for any given cylindrical holder. Also, the radial apertures in such cylindrical holder would preclude easy removal of the individual finger dies when any large amount of axial compressive force was used on the laminated rotor, as is customary practice today. Such practice today is to diecast molten metal into the slots in a laminated rotor to form the squirrel cage with the rotor laminations being held under an axial compressive force of from 1500 to 10,000 p.s.i. This axial force is necessary to resist the casting pressure where the molten metal is die-cast into the mold cavity and rotor slots under high pressures. High pressures are, of course, desired in order to completely fill the mold cavity quickly without any voids.

The prior art has also proposed removable finger dies which were L-shaped or T-shaped with the head at the outer end and each finger die abutting the peripherally adjacent finger dies. With the present day system of high axial pressures on the laminated rotor, this would mean that the four sides of each finger die had a high frictional contact, two sides with the laminations and the remaining two sides with contiguous finger dies to make it extremely difficult to remove the finger dies after casting the squirrel cage in the laminated rotor.

The prior art also had proposed removable finger dies but there were limitations in the minimum peripheral width of the dies relative to the peripheral width of the diecast rotor bars. This was because the removable finger dies had to extend radially toward the axis of the rotor and to touch each other at a point which is outboard of any axial ventilating ducts within the rotor. This seriously limited the design possibilities of the squirrel cage rotor to ones where relatively thick finger dies in a peripheral direction were utilized.

Accordingly, an object of the invention is to provide a spacer assembly for a ventilating duct in a squirrel cage rotor which obviates the above disadvantages.

Another object of the invention is to provide a spacer for forming a radial ventilating duct which is easier and more economical to manufacture and which uses less material.

Another object of the invention is to provide a ventilating duct spacer assembly which is easier to assemble and use in the manufacture of a squirrel cage rotor.

Another object of the invention is to provide a ventilating duct spacer assembly in which finger dies are utilized which have less friction with the complete rotor and, hence, may be more easily removed.

Another object of the invention is to provide clamp ring means to clamp a plurality of individual parts in place to form a spacer assembly which is arch-bound to permit handling as a unit.

Another object of the invention is to provide a clamp ring for a ventilating duct spacer assembly which clamp ring holds individual parts in place including finger dies and metal clips so that these parts resist the diecasting pressure.

Another object of the invention is to provide a metal clip as a part of a mold means restricting the flow of diecasting material in a squirrel cage rotor.

Another object of the invention is to provide a clip disposed inboard of a slot in a diecast squirrel cage rotor where the clip is not destroyed by the diecast metal and acts as a part of a mold means restricting flow of the diecast metal.

Another object of the invention is to utilize a metal clip as part of a mold means to be molded into the diecast metal of the slot so that the clip is retained in place on the diecast metal.

Another object of the invention is to provide a metal clip as a part of a radial duct spacer assembly wherein the axial dimension of the clip is greater than that of removable die means to thus both aid in the removal of the die means and also aid in the retention of the clip between laminations of a squirrel cage rotor.

Another object of the invention is to provide a clamp ring which makes a unitary assembly of a ventilating duct spacer so that this unitary assembly is used throughout the manufacturing process of forming the squirrel cage rotor until the spacer assembly is ready to be disassembled.

Another object of the invention is to provide a metal clip as part of a duct spacer assembly wherein the metal clip may be easily placed in the spacer assembly and which is retained in place by the inherent spring tension of legs of the clip.

Other objects and a fuller understanding of the invention may be had by referring to the following description and claims, taken in conjunction with the accompanying drawings, in which:

FIGURES 5 and 6 are top and sectional views to a reduced scale of the assembly procedure of the temporary spacer assembly;

FIGURE 7 is a partial view on line 7—7 of FIGURE 5;

Figure 1:
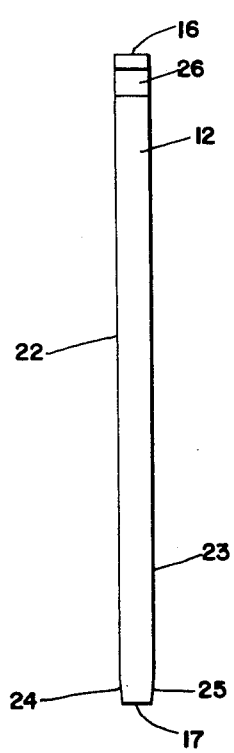
FIGURES 1 and 2 are top and side views of a removable finger die used in the invention.
Figure 2:
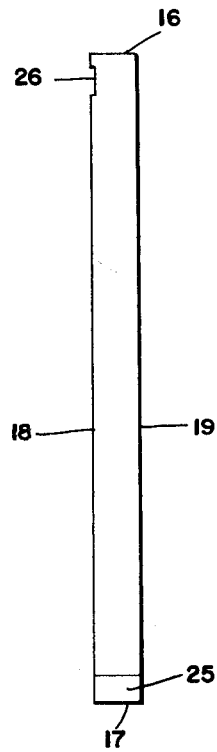
Figure 3:
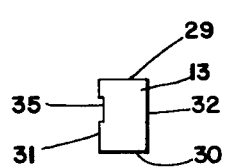
FIGURES 3 and 4 are top and side views of a removable insert.
Figure 4:
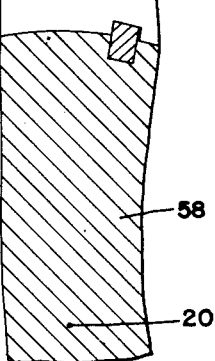

The figures of the drawing show a spacer assembly 11, including generally, a plurality of removable finger dies 12, a plurality of removable inserts 13, a plurality of clips 14 and a split clamp ring 15. The spacer assembly 11 is shown in partial view in FIGURE 8. One of the removable dies 12, which are all identical, is shown in FIGURES 1 and 2. FIGURES 3 and 4 show one of the identical removable inserts 13.

The removable finger dies 12 are of substantially rectangular cross section throughout and have an outer end 16 and an inner end 17. Each finger die has an upper surface 18 and a lower surface 19 with these two surfaces being slightly tapered, that is, slightly closer together at the inner end 17 than at the outer end 16. This slight taper might be a difference of about .010" in height of this finger die 12 which is the dimension parallel to the axis 20 of the complete rotor 21, see FIGURE 10. The finger dies each have two opposite side surfaces 22 and 23 which are substantially parallel throughout substantially the entire length of each finger die. The inner end of each finger die may have tapered mating surfaces 24 and 26 on opposite sides for engagement with contiguous finger dies when all are nested in the complete spacer assembly 11. A removal tool notch 26 may be provided on the outer end of each finger die 12 in that portion of the finger die which extends outboard of the laminations of the rotor 21.

Each removable insert 13 has an outer end 29 and an inner end 30 and upper and lower surfaces 31 and 32, respectively. Each insert 13 has opposite side surfaces 33 and 34, respectively, and the upper surface 31 may contain a removal tool notch 35. The upper and lower surfaces 31 and 32 are preferably parallel. The side surfaces 33 and 34 are tapered to be closer together at the inner end 30 than at the outer end 29. This tapering of the side surfaces 33 and 34 permits them to lie in intimate contact with the contiguous side surfaces 22 and 23 of the removable finger dies 12.

Figure 11:
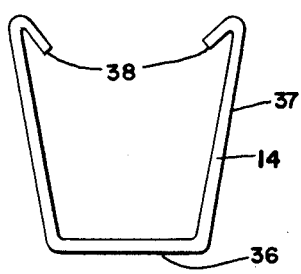
Figure 12:
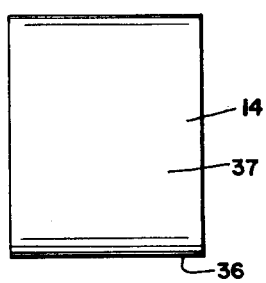

FIGURES 11 and 12 show the preferred construction of the metal clips 14 and all the clips are preferably identical. Each clip has a bottom wall 36 and two side walls 37. Hooks 38 are provided at the outboard ends of the side wall 37. The walls and hooks of the clip 14 are preferably integral with the clip 14, being easily fabricated from sheet steel such as shim stock in the order of .015 to .025" thick. In side view, as seen in FIGURE 12, the clip 14 is substantially rectangular. In plan view, as seen in FIGURE 11, the two side walls 37 diverge slightly at a small angle. The hooks 38 extend back toward the bottom wall 36 at an acute included angle.

Figure 8:
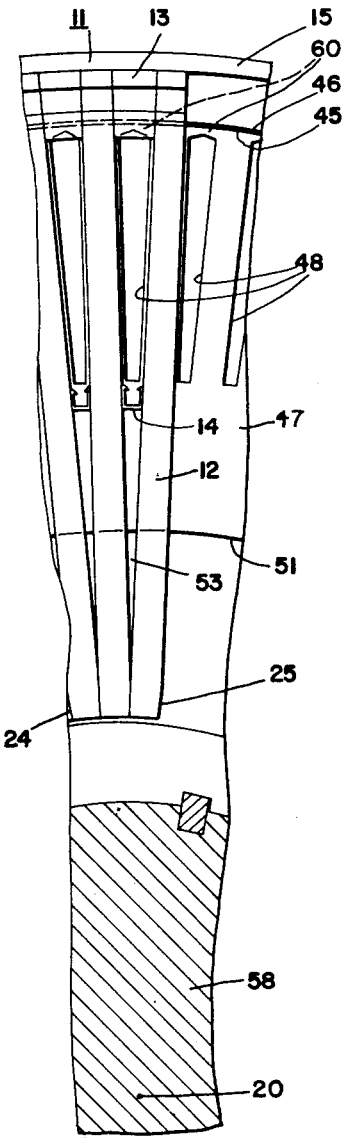
FIGURE 8 is a partial sectional view of the spacer assembly mounted on a group of rotor laminations ready for diecasting.
Figure 10:
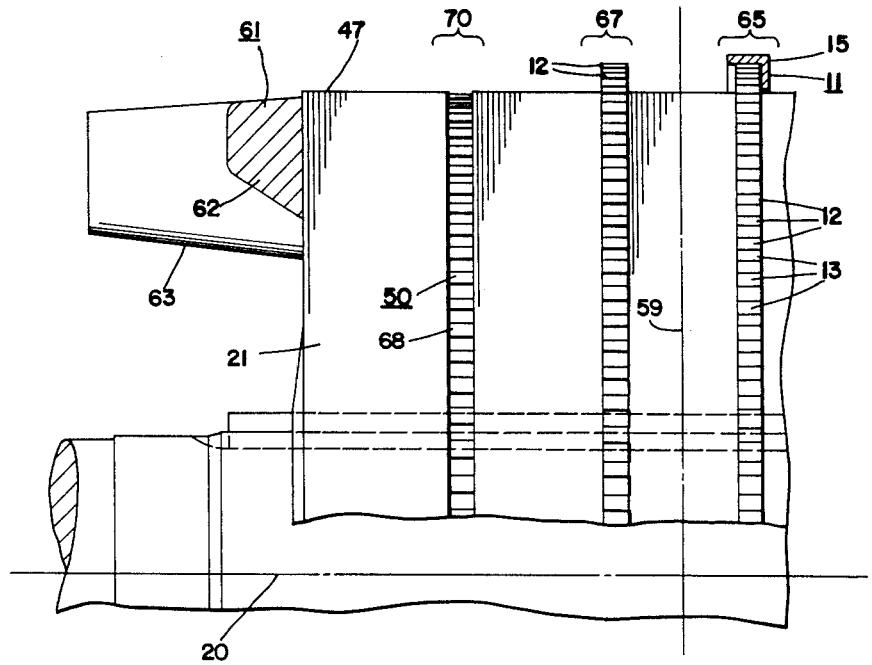
FIGURE 10 is a partial longitudinal view of the rotor of FIGURE 9, also in various stages of disassembly; and, FIGURES 11 and 12 are plan and side views of the metal clip used in the spacer assembly.
Figure 9:
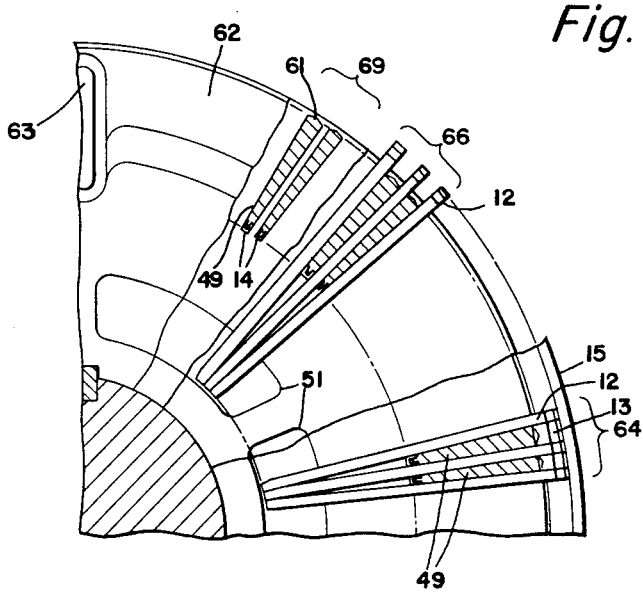
FIGURE 9 is a partial end and sectional view of the laminated rotor after diecasting and in various stages of disassembly.

FIGURES 5, 6 and 7 show how the spacer assembly 11 may be readily assembled and it includes the split clamp ring 15. A circular plate 40 may be supported on a table or other support 41. The split clamp ring 15 is generally L-shaped in cross section with a lower flange 42 and an outer peripheral shoulder 43. The thickness of the flange 42 is the same as that of the plate 40 and, thus, provides a planar surface 44 to support the outer end of the removable finger dies 12 and the removable inserts 13. The inside diameter 45 of the lower flange 42 closely encircles the plate 40 and also closely encircles the outside diameter 46 of the rotor laminations 47 when assembled in the complete rotor 21, as shown in FIGURES 8, 9 and 10. The assembler utilizes the plate 40 and the split clamp ring 15 to alternately assemble the finger dies 12 and removable inserts 13. The width of the finger dies 12 and inserts 13 is, of course, governed by the peripheral spacing of the longitudinal slots 48 in the rotor laminations 47. Preferably, the spacing between adjacent finger dies 12 is made slightly greater than the peripheral width of the slot 48. Thus, when the diecast metal forming the squirrel cage bars is diecast into the complete rotor 21, the rotor bars 49 filling the slots 48 at each of the radial ventilating ducts 50 is peripherally wider than the slot in the lamination to thus key the rotor bars 49 to the laminations 47 and prevent expansion and loosening of the individual laminations 47.

After the complete circle of finger dies 12 and removable inserts 13 have been put in place, then the mating surfaces 24 and 25 at the inner ends of the finger dies 12 will be in engagement.

Next, the clips 14 may be inserted between adjacent finger dies 12. The dimensioning of the clips 14 is such that they will be established in position slightly inboard of the slots 48. This is established by the length of the bottom wall 36 which length dimension extends peripherally around the rotor 21. The diverging side walls 39 preferably diverge at a slightly greater angle than the angle of adjacent finger dies 12, thus, as the clips 14 are pushed into position by pushing radially inwardly thereon, the side walls 37 are pressed into intimate contact with the adjacent side walls 22 and 23 of the finger dies 12. This insures resilient and firm contact between the side walls 37 of the clips 14 and the adjacent finger dies.

The clips 14 preferably have a dimension parallel to the axis 20 of the rotor 21 which is slightly greater than the axial dimension of the finger dies 12, namely, the dimension between upper and lower surfaces 18 and 19. This slight excess of axial length may be in the order of .010". The fact that the side walls 37 are longer than the bottom wall 36 insures easy placement of the clips 14 in the spacer assembly 11 by insuring that the clips 14 may readily be inserted in only one attitude. This is also aided by the slightly diverging side walls 37.

The clips 14 are especially useful where axial ventilating ducts 51 are used in the rotor 21. These clips 14 prevent radial inward flow of the diecast metal to the point where such metal would flow into the axial vent ducts 51 as at the space 53. In those cases where the peripheral width of the slot 48 is large relative to the peripheral width of the finger dies 12, then the individual finger dies 12 must be made long and slender to extend relatively closely to the rotor axis 20. In such case there is a space 53 between the finger dies 12 which merges with the axial vent ducts 51. The use of the clips 14 prevents diecast metal from flowing into this space 53 and, hence, into the axial vent ducts 51.

The clips 14 thus permit greater latitude in the design of squirrel cage rotors by permitting axial vent ducts 51 radially further out than if the clips 14 were not used. It will be seen that if the finger dies 12 were considerably wider, in a peripheral direction, than the width of the slots 48, then the mating surfaces 24 and 25 on the finger dies 12 would be at a point a greater radial distance from the axis 20 than is the case, as shown in FIGURE 8. However, this means that the slots 48 must be narrow, thus limiting the conductivity which may be obtained. By using the clips 14, relatively wide slots may be used even though axial vent ducts may be used which are at a considerable distance from the rotor axis 21.

The clamp ring 15 is split preferably along an angular cut 56. A bolt and nut means 57 may be used to tighten the split clamp ring 15 together to arch bind together all the finger dies 12, removable inserts 13 and clips 14. There may be in the order of 50 to 100 of these finger dies 12, and the same number of inserts 13 and clips 14 in any given spacer assembly 11. This number will, of course, be equal to the number of slots 48 with the larger numbers usually being used in larger diameter rotors, for example, from twelve to eighteen inches in diameter. When the bolt and nut means 57 is tightened, then this brings the tapered side surfaces 33 and 34 of each of the inserts into intimate engagement with the adjacent finger dies 12. It is possible, in the use of this invention, to utilize finger dies 12 which are considerably shorter in radial length than those shown in FIGURE 8, but otherwise having the same dimensions. This means that the inner end 17 of these finger dies would terminate at a position where the inner ends did not touch and could possibly terminate at any place between the place shown and the clips 14. The fact that the removable inserts 13 plus the finger dies 12 are arch-bound at the outer periphery in the split clamp ring 15, assures that the finger dies 12, inserts 13 and clips 14 will be bound together as a unitary spacer assembly, even though the inner ends of the finger dies 12 are not in contact. This binding together to make a unitary assembly is aided by the fact that the clips 14 are in place inboard of the slots 48. The entire assembly is arch-bound together so that it may be handled as a unit. This unit of the spacer assembly 11 may then be placed on a stack of a group of laminations 47, as shown in FIGURE 8, and rotated slightly to have the spaces between finger dies 12 aligned with the rotor slots 48. Another group of laminations may then be placed on top, preferably as centered on a mandrel 58. FIGURE 10 shows the flexibility of using these unitary spacer assemblies 11, in that the rotor 21 has a longitudinal center line 59, and these spacer assemblies 11 between groups of laminations may be spaced longitudinally at varying distances. Since the greatest heat is usually at the longitudinal center plane of the rotor, these spacer assemblies 11 are preferably placed more closely together at the longitudinal center of the rotor to, thus, provide radial ventilating ducts spaced more closely near the center of the rotor. As assembled between the rotor laminations, as shown in FIGURE 8, the finger dies 12, removable inserts 13 and clips 14 form a mold means to restrict flow of the diecasting material.

In accordance with general practice of induction dynamoelectric machines, the rotor laminations have the slots 48 punched therein such that initially the slots are closed at the outer end. A small bridge 60 of the laminations 47 is provided at the radial outboard end of each slot. This may be in the order of only .030 to .100″. This is a small area of each lamination with which the upper and lower surfaces of the inserts 13 are in engagement. These upper and lower surfaces 31 and 32 of the inserts 13 are preferably parallel to assure good contact with the rotor laminations in this small area. A seal is required in these areas to provide the mold means which restricts flow of the diecast metal. Since the diecasting pressure may be in the order of 1500 to 10,000 p.s.i., there is considerable outward force on each of these inserts 13 and this is resisted by the clamp ring 15. The radially inward pressure of the diecast metal is resisted by the clip 14. The clips 14 preferably have a longitudinal dimension slightly greater than the longitudinal dimension between the upper and lower surfaces 18 and 19 of each finger die 12. This assures that the clips 14 bite into the metal of the lamination 47 for good sealing engagement therewith and good retention of the clip in place after diecasting. Also, this helps the removal of the finger dies 12 after diecasting of the squirrel cage 61.

The unitary spacer assemblies 11 are placed between groups of laminations 47, as shown in FIGURE 8, and the upper and lower surfaces of these spacer assemblies 11 may be coated with aquadag or other satisfactory mold parting agent. These groups of laminations and spacer assemblies 11 may then be placed in a diecasting press which accepts the mandrel 58 and axially compressed, then the squirrel cage 61 may be diecast from suitable material such as aluminum or alloys thereof. This diecasting, as is customary practice today, is usually carried out under high pressures to quickly fill the rotor slots 48 and to form the end rings 62 and fan blades 63 without any voids. The clamp ring 15 thus resists this high diecasting pressure.

After diecasting of the squirrel cage 61, the temporary spacer assemblies 11 may be removed. FIGURES 9 and 10 show the progressive disassembly of the spacer assemblies 11. Area 64 in FIGURE 9 and area 65 in FIGURE 10 show the rotor 21 with the clamp ring 15 still in place. First, the split clamp ring 15 may be removed by loosening the bolt and nut means 57. Next, the removable inserts 13 may be readily removed. Each insert has a tool removal notch 35 which may be grasped by any suitable removal tool such as lock joint pliers. Two factors permit ready removal of these inserts 13, namely, the tapered sides 33 and 34 thereon plus the fact that each insert has only a small area of contact with adjacent rotor laminations at the metal bridge 60. This bridge is only about .030 to .100″ in a radial dimension, thus, the inserts may be readily and quickly removed. The area 66 of FIGURE 9 and area 67 of FIGURE 10 show the rotor 21 with the clamp ring 15 and inserts 13 removed. Once the inserts 13 are removed, then the removable finger dies 12 are much more easily removed. Again, each finger die 12 may be grasped with a suitable tool at the tool removal notch 26 and pulled radially outwardly. The tapered upper and lower surfaces of each finger die aid this removal and the fact that the removable inserts 13 have been removed is a big factor. Since each finger die 12 is straight without any outer head, the operator can obtain a straight radial pull on each finger die 12 so that even if each finger die is quite long and slender, there is no tendency to bend such finger dies, which would, of course, destroy its usefulness.

The slightly greater axial length of the clips 14, as compared to the finger dies 12, helps keep the adjacent laminations 47 separated slightly longitudinally to help removal of each finger die 12. Also, the use of aquadag or other parting agent helps the sliding of these finger dies. As the squirrel cage cools, it will shrink. The squirrel cage 61 cannot shrink too much, however, because some of the finger dies 12 will still be in place. Thus, the rotor bars 49 will be placed under stress and will cool in this stressed condition. The rotor 21 may then be placed in a reheat furnace to reheat the rotor. This will lengthen the rotor bars 49 sufficiently so that when the rotor 21 is again removed from the furnace, the remaining finger dies are considerably easier to remove than the first finger dies removed. This permits ready removal of the finger dies 12.

An alternative method of removal of the dies 12 and inserts 13 is to grasp one insert 13 and one die 12 at the same time and remove both together. Because of the tapered surfaces 33 and 34 on the inserts 13, it is found that the frictional contact between contiguous dies 12 and inserts 13 is quickly broken upon initial outward movement and, thus, one pair of a die 12 and insert 13 may be readily removed. The operator may then proceed around the periphery of the rotor removing such pairs in sequence. When all the finger dies 12 are removed, the rotor 21 then appears as at area 69 in FIGURE 9 and area 70 in FIGURE 10. Removal of the finger dies 12 forms a plurality of individual radial ducts 68 which together establish a radial ventilating duct 50 in a single plane. There may be a plurality of these radial ventilating ducts 50 spaced along the axis 20 to properly cool the rotor 21.

The clips 14 are locked in place on the rotor bars 49 because the diecast metal enters the interior of these clips 14 and the hooks 38 become embedded in the diecast metal. Thus, even though the finger dies 12 are removed from the complete rotor 21, the clips 14 are retained in place during use of the squirrel cage rotor 21.

The finger dies 12 may be easily and quickly manufactured. They are of generally rectangular solid shape and, hence, may be cut from flat, ground stock. The tapered mating surfaces 24 and 25 may be ground to the proper angle and then the top and bottom surfaces 18 and 19 may be ground to provide the slight taper therebetween. The removal tool notch 26 may be formed in the individual pieces or may be milled, for example, in a group of pieces placed side by side either before or after cutting apart to form the individual finger dies 12.

The removable inserts 13 are also simply and easily manufactured. Flat bar stock may be used having a width equal to the dimension between outer and inner ends 29 and 30 and a thickness equal to the dimension between upper and lower surfaces 31 and 32. The removal tool notch 35 may then be milled in one face along the length of the flat bar stock. The individual inserts 13 may then be formed by cutting this flat bar stock into pieces and grinding the taper to form the two side surfaces 33 and 34. Accordingly, the finger dies 12 and removable inserts 13 are much easier to manufacture than they would be if the finger dies had an enlarged head at the outer end thereof. Also, the finger dies 12 are much easier to remove from the completed rotor 21 because of the separate and easily removable inserts 13. The finger dies 12, inserts 13 and clips 14 are easy to assemble by an assembler on a bench using the plate 40 as shown in FIGURES 5 and 6. When the spacer assembly 13 is completely assembled and the split clamp ring tightened, then this spacer assembly 11 becomes a unitary assembly which may be readily handled without any special precautions and, hence, may be readily stacked on the mandrel 58 between groups of laminations 47. Such a unitary spacer assembly 11 permits complete flexibility in the longitudinal spacing of the radial ventilating ducts 50 along the axis 20. The generally rectangular cross section throughout the length of the finger dies 12 without any enlarged head at the end thereof means that the workman can obtain a straight radial pull on the finger die 12 for removal of this finger die. This means that even though the finger die be long and slender, there is no tendency to apply a force which will bend the finger die and, thus, they have a long life.

The present invention shows that the clips 14, because of their greater axial length, aid removal of the finger dies 12. Also, as the conductor bars 49 shrink in axial length, this causes the clips 14 to bite into the adjacent laminations 47 to an even greater extent and this helps prevent dislodgement of the clips 14 from the inner ends of the rotor bars 49. Also, since the clips 14 are used, the rotor bars do not extend all the way radially inwardly to the point of contact of adjacent finger dies 12 at the mating surfaces 24 and 25. This exposes a greater area of the laminations 47 to thus promote better cooling at this radial ventilating duct 50.

The preferred material for the clips 14 is of metal such as sheet steel so that the diecasting metal will not melt or otherwise burn out such clips. If burnable material were used for these clips 14, then there could be gas pockets or voids in the diecast metal as caused by the burning of this material which could weaken the rotor bars 49 as well as change the resistance characteristics thereof. Also, if burnable material were used, it is possible this material would be burned out sufficiently upon diecasting to allow the diecast metal to flow radially inwardly into the space 53 and then into the axial vent ducts 51. This would have the bad effects of partially or completely blocking such ventilating ducts and the worse effect of utilizing all the diecasting metal so that not enough was available to form the end ring 62 or fan blades 63.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A spacer assembly for forming a radial ventilating duct between adjacent laminations in a laminated squirrel cage rotor to be provided with conductor bars cast in aligned slots in annular laminations,
    said spacer assembly comprising, in combination, a plurality of removable die means disposed between said adjacent laminations and disposed peripherally between said slots in said laminations,
    a plurality of separate metal clips disposed between said adjacent laminations and disposed inboard of said slots in said laminations and in contact with the sides of adjacent die means,
    said removable die means and said clips alternating around the periphery of said laminations,
    clamp means to clamp said removable die means and said clips in a circle as a unitary spacer assembly,
    and mold means including said two sides of said removable die means and said clips to restrict flow of diecasting material at said slots.

2. A spacer assembly for forming a radial ventilating duct between adjacent laminations in a laminated squirrel cage rotor to be provided with conductor bars cast in aligned slots in annular laminations,
    said spacer assembly comprising, in combination, a plurality of removable die means disposed between said adjacent laminations and disposed peripherally between said slots in said laminations,
    a plurality of metal clips disposed between said adjacent laminations and disposed inboard of said slots in said laminations,
    said removable die means and said clips alternating around the periphery of said laminations,
    each said clip having bottom wall means and side wall means with said side wall means engaging adjacent sides of said removable die means,
    mold means including said two sides of said removable die means and said clips to restrict flow of diecasting material at said slots,
    and hook means connected to said clips locking into the diecasting material entering the interior of said clips from said slots to retain said clips on the diecasting material.

3. A spacer assembly for forming a radial ventilating duct between adjacent laminations in a laminated squirrel cage rotor to be provided with conductor bars cast in aligned slots in annular laminations,
    said spacer assembly comprising, in combination, a plurality of removable die means disposed between said adjacent laminations and disposed between said slots in said laminations,
    a plurality of metal clips disposed between said adjacent laminations and disposed inboard of said slots in said laminations,
    said removable die means and said clips alternating around the periphery of said laminations,
    each said clip having bottom wall means and side wall means with said side wall means engaging adjacent sides of said removable die means,
    clamp means to clamp said removable die means and said clips in a circle as a unitary spacer assembly,
    mold means including said two sides of said removable die means and said clips to restrict flow of diecasting material at said slots,
    and hook means connected to said clips locking into the diecasting material entering the interior of said clips from said slots to retain said clips on the diecasting material.

4. A spacer assembly for forming a radial ventilating duct between adjacent laminations in a laminated squirrel cage rotor to be provided with conductor bars cast in aligned slots in annular laminations,
    said spacer assembly comprising, in combination, a plurality of removable finger die means disposed between said adjacent laminations,
    a plurality of metal clips disposed between said adjacent laminations,
    said finger die means and said clips alternating around the periphery of said laminations,
    each said clip having bottom wall means and side wall means with said side wall means engaging adjacent sides of said finger die means,
    clamp ring means to encircle the outer ends of each said finger die means to clamp same and said clips in a circle as a unitary spacer assembly, mold means including said two sides of said finger die means and said clips to restrict flow of diecasting material at said slots, and hook means connected to said clips locking into the diecasting material entering the interior of said clips from said slots to retain said clips on the diecasting material.

5. A spacer assembly for forming a radial ventilating duct between adjacent laminations in a laminated squirrel cage rotor to be provided with conductor bars cast in aligned slots in annular laminations, said spacer assembly comprising, in combination, a plurality of removable finger die means disposed between said adjacent laminations, a plurality of metal clips disposed between said adjacent laminations, said finger die means and said clips alternating around the periphery of said laminations, each said clip having bottom wall means and side wall means connected thereto, said side wall means in the unstressed state having a dimension therebetween greater than the distance betwen adjacent finger die means at the area of contact to insure resilient and firm contact of said side wall means of each said clip with adjacent sides of said finger die means, said clips being inserted between adjacent finger die means with said bottom wall means closer to the axis of said rotor laminations than said side wall means, clamp ring means to encircle the outer ends of each said finger die means to clamp same and said clips in a circle as a unitary spacer assembly, mold means including said two sides of said finger die means and said clips to restrict flow of diecasting material at said slots, and hook means connected to said clips and locking into the diecasting material entering the interior of said clips from said slots to retain said clips on the diecasting material.

6. A spacer assembly for forming a radial ventilating duct between adjacent laminations in a laminated squirrel cage rotor to be provided with conductor bars cast in aligned slots in annular laminations, said spacer assembly comprising, in combination, a plurality of removable finger die means disposed between said adjacent laminations, a plurality of metal clips disposed between said adjacent laminations, said finger die means and said clips alternating around the periphery of said laminations, each said clip having bottom wall means and side wall means connected thereto, hook means connected near the outer end of said side wall means and extending toward said bottom wall means at an acute included angle, said side wall means in the unstressed state having a dimension therebetween greater than the distance between adjacent finger die means at the area of contact to insure resilient and firm contact of said side wall means of each said clip with adjacent sides of said finger die means, the axial height of said clips slightly exceeding the axial height of each said finger die means, said clips being inserted between adjacent finger die means with said bottom wall means closer to the axis of said rotor laminations than said side wall means, clamp ring means to encircle the outer ends of each said finger die means to clamp same and said clips in a circle as a unitary spacer assembly, mold means including said two sides of said finger die means and said clips to restrict flow of diecasting material at said slots, and said hook means locking into the diecasting material entering the interior of said clips from said slots to retain said clips on the diecasting material.

7. A temporary and partially removable spacer for forming a radial ventilating duct between adjacent laminations in a laminated squirrel cage rotor to be provided with conductor bars cast in aligned slots in annular laminations of pre-determined outer diameter, said spacer comprising, in combination, a plurality of removable finger die means disposed between said adjacent laminations, said finger die means being generally radially spaced around the periphery of said laminations adjacent said outer diameter, means spacing apart said finger die means in the area of said aligned slots, each finger die means being slightly tapered on the two upper and lower sides in contact with the adjacent laminations, each finger die means being substantially parallel on the two remaining sides throughout substantially the entire length of the finger die in engagement with the laminations, said two remaining sides adapted to form mold means restricting the flow of casting material forming the conductor bars, a plurality of metal clips disposed between said adjacent laminations and one each between said two remaining sides of said finger die means radially inwardly of said slots, each said clip having a bottom wall and two diverging side walls integrally connected thereto, a hook integrally connected to the outer end of each said side wall and bent back at an acute included angle, said two side walls in the unstressed state diverging at an angle greater than the diverging angle between adjacent finger die means to insure resilient and firm contact of the length of said side walls of each said clip with adjacent sides of said finger die means, the axial height of each said clip exceeding the axial height of each said finger die means in the order of .010 inch, said clips being inserted between adjacent finger die means with said bottom wall closer to the axis of said rotor laminations than said side walls, the length of said bottom wall of said clips establishing the position of each said clip radially inwardly of the aligned slots in said laminations, mold means including said two sides of said finger die means and said clips to restrict flow of said diecasting material, and said hooks locking into the diecasting material entering the interior of said clips from said slots to retain said clips on the diecasting material.

8. A spacer assembly for forming a radial ventilating duct between adjacent laminations in a laminated squirrel cage rotor to be provided with conductor bars cast in aligned slots in annular laminations, said spacer asembly comprising, in combination, a plurality of removable finger die means disposed between said adjacent laminations, a plurality of metal clips disposed betewen said adjacent laminations, said finger die means and said clips alternating around the periphery of said laminations, each said clip having a bottom wall and two diverging side walls integrally connected thereto, a hook connected near the outer end of each said side wall and extending back at an acute included angle, said two side walls in the unstressed state diverging at an angle greater than the diverging angle between adjacent finger die means to insure resilient and firm contact of the length of said side walls of each said clip with adjacent sides of said finger die means, the axial height of said clips slightly exceeding the axial height of each said finger die means, said clips being inserted between adjacent finger die means with said bottom wall closer to the axis of said rotor laminations than said side walls, clamp ring means to encircle and abut the outer ends of each said finger die means to clamp same and said clips in a circle as a unitary spacer assembly, mold means including said two sides of said finger die means and said clips to restrict flow of diecasting material at said slots, and said hooks locking into the diecasting material entering the interior of said clips from said slots to retain said clips on the diecasting material.

9. A temporary and partially removable spacer assembly for forming a radial ventilating duct between adjacent groups of laminations in a laminated squirrel cage rotor to be provided with conductor bars cast in aligned slots in annular laminations of pre-determined outer diameter, said spacer assembly comprising, in combination, a plurality of removable finger die means disposed between said adjacent groups of laminations, each finger die means having a width between the two sides at the outer end at least as great as at the inner end thereof, said finger die means being generally radially spaced around the periphery of said laminations adjacent said outer diameter, means spacing apart said finger die means in the area of said aligned slots, a plurality of metal clips disposed between said adjacent laminations and one each between said two sides of said finger die means radially inwardly of said slots, each said clip having a bottom wall and two diverging side walls integrally connected thereto, a hook integrally connected to the outer end of each said side wall and bent back at an acute included angle, said two side walls in the unstressed state diverging at an angle greater than the diverging angle between adjacent finger die means to insure resilient and firm contact of the length of said side walls of each said clip with adjacent sides of said finger die means, the axial height of said clips slightly exceeding the axial height of each said finger die means, clamp ring means to encircle and abut the outer ends of each said finger die means to clamp same in a circle with said clips alternating therebetween as a unitary spacer assembly, said clips being inserted between adjacent finger die means with said bottom wall closer to the axis of said rotor laminations than said side walls, mold means including said two sides of said finger die means and said clips to restrict flow of casting material at said slots, and said hooks locking into the diecasting material entering the interior of said clips from said slots to retain said clips on the diecasting material.

10. A temporary and partially removable spacer assembly for forming a radial ventilating duct between adjacent groups of laminations in a laminated squirrel cage rotor to be provided with conductor bars cast in aligned slots in annular laminations of pre-determined outer diameter.

said spacer assembly comprising, in combination, a plurality of removable finger die means disposed between said adjacent groups of laminations, each finger die means having a width between the two sides at the outer end at least as great as at the inner end thereof, said finger die means being generally radially spaced around the periphery of said laminations adjacent said diameter, means spacing apart said finger die means in the area of said aligned slots, said two sides adapted to form mold means restricting the flow of casting material forming the conductor bars, a plurality of metal clips disposed between said adjacent laminations and one each between said two sides of said finger die means radially inwardly of said slots, each said clip having a bottom wall and two diverging side walls integrally connected thereto, a hook connected near the outer end of each said side wall and extending back at an acute included angle, said two side walls in the unstressed state diverging at an angle greater than the diverging angle between adjacent finger die means to insure resilient and firm contact of the length of said side walls of each said clip with adjacent sides of said finger die means, the axial height of said clip exceeding the axial height of each said finger die means in the order of .010 inch, clamp ring means to encircle and abut the outer ends of each said finger die means to clamp same in a circle with said clips alternating therebetween as a unitary spacer assembly, said clips being inserted between adjacent finger die means with said bottom wall closer to the axis of said rotor laminations than said side walls, the length of said bottom wall of said clip establishing the position of each said clip radially inwardly of the aligned slots in said laminations, said clips forming a part of said mold means to restrict radially inward flow of casting material between said finger die means, and said hooks locking into the diecasting material entering the interior of said clips from said slots to retain said clips on the diecasting material.

11. A temporary and partially removable spacer assembly for forming a radial ventilating duct between adjacent groups of laminations in a laminated squirrel cage rotor to be provided with conductor bars cast in aligned slots in annular laminations of pre-determined outer diameter, said spacer assembly comprising, in combination, a plurality of removable finger die means disposed between said adjacent groups of laminations, said finger die means being generally radially spaced around the periphery of said laminations adjacent said outer diameter, means spacing apart said finger die means in the area of said aligned slots, each finger die means being slightly tapered on the two upper and lower sides in contact with the adjacent laminations, each finger die means being substantially parallel on the two remaining sides throughout substantially the entire length of the finger die in engagement with the laminations, said two remaining sides adapated to form mold means restricting the flow of casting material forming the conductor bars, a plurality of metal clips disposed between said adjacent laminations and one each between said two remaining sides of said finger die means radially inwardly of said slots, each said clip having a bottom wall and two diverging side walls integrally connected thereto, a hook integrally connected to the outer end of each said side wall and bent back at an acute included angle, said two side walls in the unstressed state diverging at an angle greater than the diverging angle between adjacent finger die means to insure resilient and firm contact of the length of said side walls of each said clip with adjacent sides of said finger die means, the axial height of said clip exceeding the axial height of each said finger die means in the order of .010 inch, clamp ring means to encircle and abut the outer ends of each said finger die means to clamp same in a circle with said clips alternating therebetween as a unitary spacer assembly, said clips being inserted between adjacent finger die means with said bottom wall closer to the axis of said rotor laminations than said side walls, said side walls being longer than said bottom wall to insure placement of said clips in only one attitude, the length of said bottom wall of said clip establishing the position of each said clip radially inwardly of the aligned slots in said laminations, said clips forming a part of said mold means to restrict radially inward flow of casting material between said finger die means, and said hooks locking into the diecasting material entering the interior of said clips to retain said clips on the diecasting material.

References Cited in the file of this patent
UNITED STATES PATENTS

| | | |
|---|---|---|
| 1,669,071 | Thomas | May 8, 1928 |
| 1,913,138 | Apple | June 6, 1933 |
| 2,486,798 | Mollenhauer | Nov. 1, 1949 |
| 2,504,824 | George | Apr. 18, 1950 |
| 2,841,838 | Covitt | July 8, 1958 |